US009208252B1

(12) United States Patent
Cooley

(10) Patent No.: US 9,208,252 B1
(45) Date of Patent: Dec. 8, 2015

(54) REDUCING MULTI-SOURCE FEED READER CONTENT REDUNDANCY

(75) Inventor: Shaun Cooley, El Segundo, CA (US)

(73) Assignee: Symantec Corporation, Mountain View, CA (US)

(*) Notice: Subject to any disclaimer, the term of this patent is extended or adjusted under 35 U.S.C. 154(b) by 692 days.

(21) Appl. No.: 13/017,870

(22) Filed: Jan. 31, 2011

(51) Int. Cl.
*G06F 17/30* (2006.01)
*H04L 12/58* (2006.01)

(52) U.S. Cl.
CPC .... *G06F 17/30905* (2013.01); *G06F 17/30867* (2013.01); *G06F 17/30873* (2013.01); *H04L 12/588* (2013.01); *H04L 51/32* (2013.01)

(58) Field of Classification Search
None
See application file for complete search history.

(56) References Cited

U.S. PATENT DOCUMENTS

| | | | |
|---|---|---|---|
| 6,243,757 B1 * | 6/2001 | Kanodia et al. | 709/235 |
| 7,590,691 B2 * | 9/2009 | Gonsalves et al. | 709/205 |
| 7,761,423 B1 * | 7/2010 | Cohen | 707/637 |
| 7,818,392 B1 * | 10/2010 | Martino et al. | 709/217 |
| 7,912,894 B2 * | 3/2011 | Adams | 709/201 |
| 7,957,723 B2 * | 6/2011 | Punaganti Venkata et al. | 455/412.1 |
| 7,979,527 B2 * | 7/2011 | Bardsley | 709/223 |
| 8,103,629 B2 * | 1/2012 | Sagar et al. | 707/626 |
| 8,200,775 B2 * | 6/2012 | Moore | 709/217 |
| 8,214,445 B2 * | 7/2012 | Bardsley | 709/206 |
| 8,239,494 B2 * | 8/2012 | Lunt | 709/219 |
| 8,560,575 B2 * | 10/2013 | Gradin et al. | 707/802 |
| 8,589,418 B1 * | 11/2013 | Kane | G06Q 30/02 707/749 |
| 8,732,147 B2 * | 5/2014 | Nealer | H04M 1/72519 707/705 |
| 8,745,481 B1 * | 6/2014 | Ulm | G06F 17/211 715/201 |
| 8,954,451 B2 * | 2/2015 | Zendejas | G06F 17/30867 707/728 |
| 8,984,098 B1 * | 3/2015 | Tomkins | G06F 17/30867 709/219 |
| 9,110,882 B2 * | 8/2015 | Overell | G06F 17/2785 |
| 2007/0083520 A1 * | 4/2007 | Shellen | G06F 17/3089 |
| 2008/0034045 A1 * | 2/2008 | Bardsley | 709/206 |
| 2008/0126476 A1 * | 5/2008 | Nicholas et al. | 709/203 |
| 2009/0119375 A1 * | 5/2009 | Shenfield | H04L 67/26 709/206 |
| 2009/0222527 A1 * | 9/2009 | Arconati et al. | 709/206 |
| 2009/0292548 A1 * | 11/2009 | Van Court | 705/1 |
| 2009/0299976 A1 * | 12/2009 | Dexter | G06F 17/24 |
| 2010/0131455 A1 * | 5/2010 | Logan et al. | 707/602 |
| 2010/0162375 A1 * | 6/2010 | Tiu, Jr. | G06F 17/3089 726/7 |
| 2010/0312769 A1 * | 12/2010 | Bailey et al. | 707/740 |
| 2011/0022669 A1 * | 1/2011 | Pascoe | G06Q 30/02 709/206 |
| 2011/0082848 A1 * | 4/2011 | Goldentouch | 707/706 |
| 2011/0113032 A1 * | 5/2011 | Boscolo | G06F 17/3089 707/737 |
| 2011/0119239 A1 * | 5/2011 | Jabaud et al. | 707/692 |
| 2011/0137894 A1 * | 6/2011 | Narayanan | G06F 17/3089 707/723 |
| 2011/0191372 A1 * | 8/2011 | Kaushansky | G06Q 30/02 707/776 |
| 2011/0191406 A1 * | 8/2011 | Plunkett et al. | 709/203 |
| 2011/0231296 A1 * | 9/2011 | Gross | G06Q 10/10 705/319 |

(Continued)

*Primary Examiner* — Greg C Bengzon
(74) *Attorney, Agent, or Firm* — Brill Law Office; Jeffrey Brill

(57) ABSTRACT

The number of redundant content items provided to a user by a multi-source feed reader is automatically reduced. Each content item obtained by the multi-source feed reader from each feed to which the users subscribes is analyzed prior to being made available to the user. More specifically, the content items are analyzed to determine whether they are based on source content from different feeds. Each content item is searched for attributes indicating a source on which it is based. Where it is determined that a content item from a first feed is based on source content from a second feed, it is further determined whether the user subscribes to the second feed which the source content is from. If so, the specific received content item from the first feed is not provided to the user.

18 Claims, 4 Drawing Sheets

(56) References Cited

U.S. PATENT DOCUMENTS

| | | | |
|---|---|---|---|
| 2011/0246457 A1* | 10/2011 | Dong et al. .................. 707/725 |
| 2011/0246484 A1* | 10/2011 | Dumais et al. ............... 707/749 |
| 2012/0005209 A1* | 1/2012 | Rinearson et al. ............ 707/737 |
| 2012/0042020 A1* | 2/2012 | Kolari et al. ................. 709/206 |
| 2012/0054115 A1* | 3/2012 | Baird-Smith ......... G06Q 10/10 705/319 |
| 2012/0066618 A1* | 3/2012 | Barker .............. G06F 17/30185 715/753 |
| 2012/0072360 A1* | 3/2012 | Sarbaev ................ G06Q 10/10 705/319 |
| 2012/0102402 A1* | 4/2012 | Kwong ......................... 715/705 |
| 2012/0124149 A1* | 5/2012 | Gross et al. .................. 709/206 |
| 2012/0131139 A1* | 5/2012 | Siripurapu et al. ..... H04L 65/60 709/217 |
| 2012/0150971 A1* | 6/2012 | Bahrainwala et al. ........ 709/206 |
| 2012/0179752 A1* | 7/2012 | Mosley et al. ................ 709/204 |
| 2012/0259866 A1* | 10/2012 | Austin ................ G06F 17/3089 707/748 |
| 2012/0278187 A1* | 11/2012 | Lunt .......................... 705/14.73 |
| 2012/0290605 A1* | 11/2012 | Ickman ............. G06F 17/30867 707/769 |
| 2012/0323704 A1* | 12/2012 | Steelberg et al. ........... 705/14.73 |
| 2013/0066841 A1* | 3/2013 | Rose ............................. 707/692 |
| 2013/0173531 A1* | 7/2013 | Rinearson ......... G06F 17/30011 707/608 |
| 2013/0254298 A1* | 9/2013 | Lorphelin ..................... 709/205 |
| 2013/0304822 A1* | 11/2013 | Tetreault ............ H04N 21/2187 709/204 |

\* cited by examiner

REDUCING MULTI-SOURCE FEED READER CONTENT REDUNDANCY

TECHNICAL FIELD

This disclosure pertains generally to electronic information aggregation, and more specifically to reducing redundant content in the context of a multi-source feed reader.

BACKGROUND

A multi-source feed reader aggregates content from multiple syndicated feeds. Typically, multi-source feed readers are web based, such that syndicated information such as news, blogs, and/or similar items from multiple feeds are aggregated at a single web site for convenient access. With the popularity of multi-source feed readers such as Google Reader, NetVibes, BlogLines and even Microsoft Outlook, it is apparent that blogs have become an important source of information for many people, especially those who are more technical.

A problem with getting one's news and other information from a multi-source feed reader is that many users subscribe to one more than one feed on a single topic (e.g., both Gizmodo and Engadget on consumer electronics devices, or both Mashable and TechCrunch on Web 2.0 issues). This would not be a problem but for the fact that most blogs and many other web information providers derive their content from the same sources: other blogs, online news sites and mainstream media (newspapers, television, etc.). Typically, a single party breaks a story, and the every other online information provider repeats the story in slightly modified language. This results in multi-source feed readers providing the same information to users multiple times, in slightly different forms.

Note that the problem is not that a multi-source feed reader provides an identical article or blog entry multiple times. Conventional duplicate elimination functionality can eliminate exact duplicates of individual items (i.e., multiple copies of the same article by the same author). The problem is that the multi-source feed reader provides multiple articles, blog entries and the like to a user, each of which is from a different source and is not a word for word copy, but which is based on a common underlying original source (either directly or indirectly), and thus contains essentially redundant information in somewhat different language. As such, the multiple items are cumulative and redundant to each other. Although such an article may at first appear to a user to be new information, upon reading it the user realizes that it is essentially the same as the other articles to which it is cumulative, although its format and exact wording varies.

It would be desirable to address these issues.

SUMMARY

A redundancy reducing management system automatically reduces redundant content items provided to a user by a multi-source feed reader. A list of a plurality of feeds to which the user subscribes through the multi-source feed reader is maintained. The multi-source feed reader obtains content items from the feeds to which the user subscribes. Each content item obtained by the multi-source feed reader from each feed of the plurality is received by the redundancy reducing management system prior to being made available to the user. Each received content item is analyzed, to determine whether it is based on source content from a different feed. More specifically, the content item can be searched for one or more attributes indicating a source on which the specific received content item is based. Where it is determined that a specific received content item from a first feed is based on source content from a second feed, it is further determined whether the user subscribes to the second feed which the source content is from. If so, the specific received content item from the first feed is not provided to the user, responsive to determining that the specific received content item is based on source content from the second feed and that the user subscribes to the second feed.

In some instances, it is determined that a received content item is not based on source content from a feed to which the user subscribes. This determination can be made by searching for but not identifying any attributes in the content item indicating a source on which it is based. Such a determination can also be made by identifying an attribute in the content item indicating a source on which it is based, and determining that the source does not comprise an additional feed to which the user subscribes. In these instances, the content item is provided to the user, responsive to determining that the content item is not based on source content from a feed to which the user subscribes.

In some embodiments where a plurality of redundant content items are identified, an indication is received from the user to provide redundant content items. Responsive to receiving this indication, the plurality of redundant content items are output to the user. This can take the form of classifying the redundant content items into a hierarchy, displaying a graphic depiction of the hierarchy of redundant content items to the user and prompting the user to select and view redundant content items of the hierarchy.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
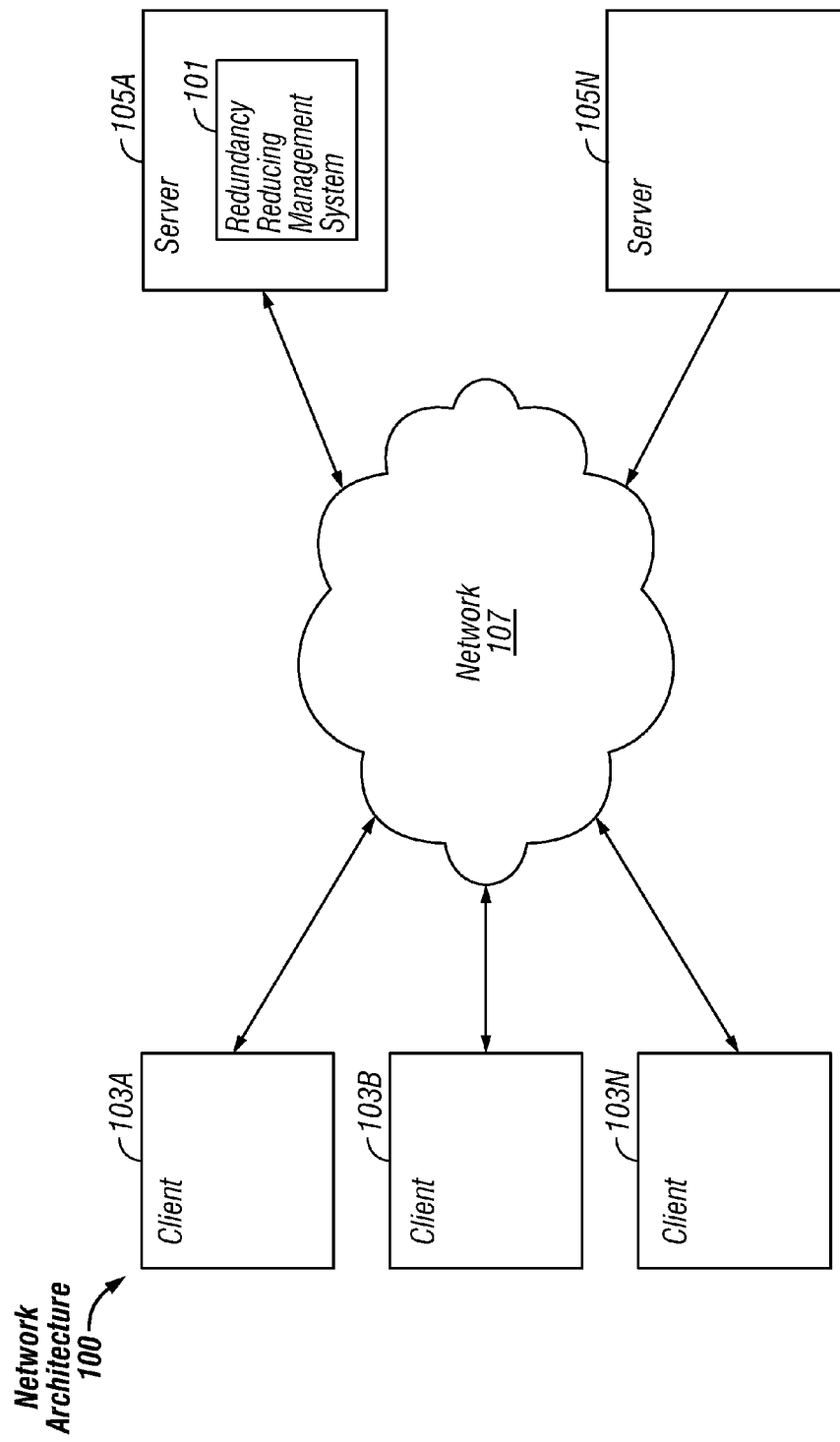
FIG. 1 is a block diagram of an exemplary network architecture in which a redundancy reducing management system can be implemented, according to some embodiments.

FIG. 1 is a block diagram illustrating an exemplary network architecture 100 in which a redundancy reducing management system 101 can be implemented. The illustrated network architecture 100 comprises multiple clients 103A, 103B and 103N, as well as multiple servers 105A and 105N. In FIG. 1, the redundancy reducing management system 101 is illustrated as residing on server 105A. It is to be understood that this is an example only, and in various embodiments various functionalities of this system 101 can be instantiated on a server 105, a client 103 or can be distributed between multiple clients 103 and/or servers 105.

Clients 103 and servers 105 can be implemented using computer systems 210 such as the one illustrated in FIG. 2 and described below. The clients 103 and servers 105 are communicatively coupled to a network 107, for example via a network interface 248 or modem 247 as described below in conjunction with FIG. 2. Clients 103 are able to access applications and/or data on servers 105 using, for example, a web browser or other client software (not shown).

Although FIG. 1 illustrates three clients and two servers as an example, in practice many more (or fewer) clients 103 and/or servers 105 can be deployed. In one embodiment, the network 107 is in the form of the Internet. Other networks 107 or network-based environments can be used in other embodiments.

Figure 2:
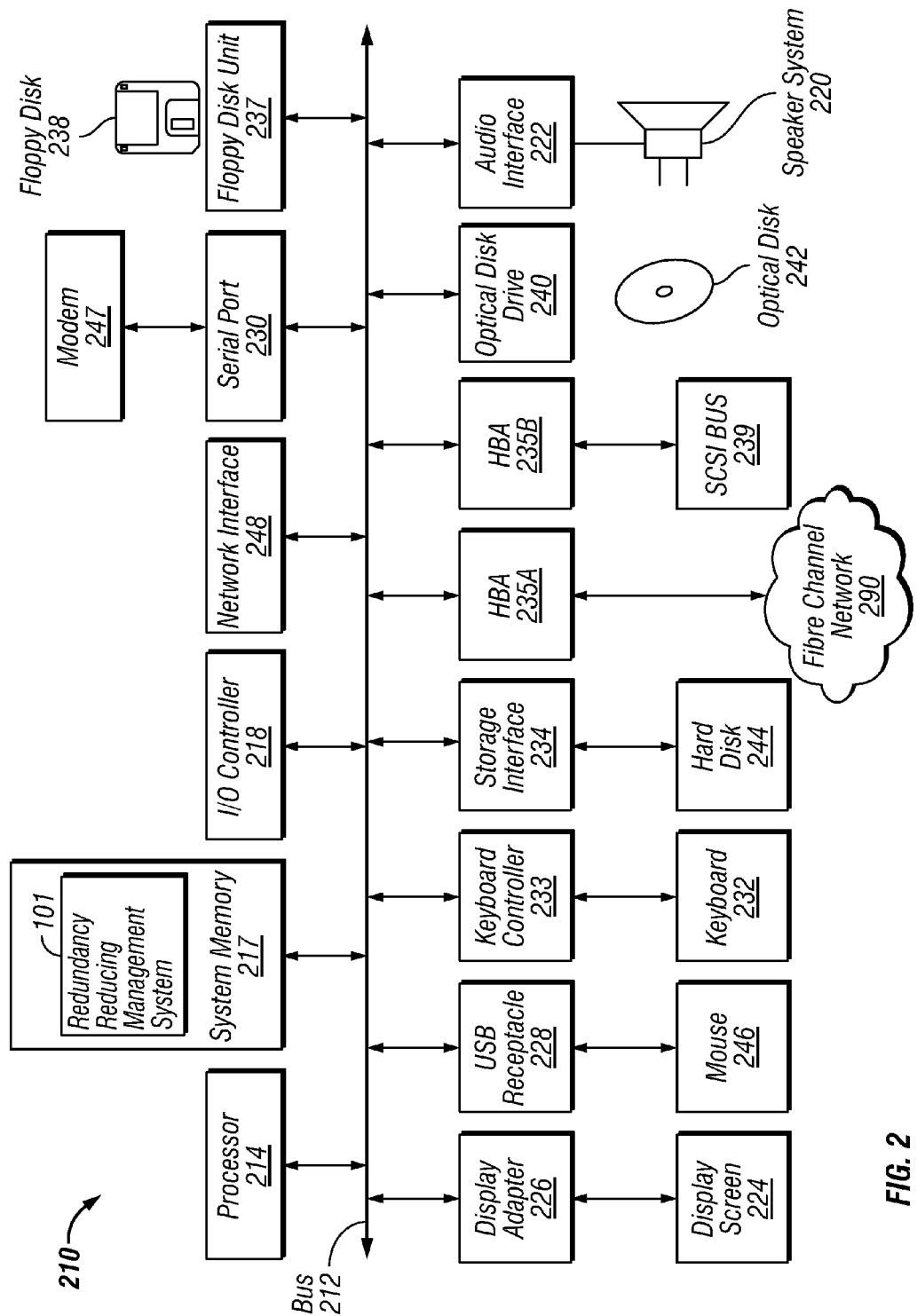
FIG. 2 is a block diagram of a computer system suitable for implementing a redundancy reducing management system, according to some embodiments.

FIG. 2 is a block diagram of a computer system 210 suitable for implementing a redundancy reducing management system 101. Both clients 103 and servers 105 can be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an external audio device such as a speaker system 220, a display adapter 226 communicatively coupled to an external video output device such as a display screen 224, one or more interfaces such as serial ports 230, Universal Serial Bus (USB) receptacles 230, parallel ports (not illustrated), etc., a keyboard controller 233 communicatively coupled to a keyboard 232, a storage interface 234 communicatively coupled to at least one hard disk 244 (or other form(s) of magnetic media), a floppy disk drive 237 configured to receive a floppy disk 238, a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212 e.g., via a USB receptacle 228, a modem 247 coupled to bus 212, e.g., via a serial port 230, and a network interface 248 coupled, e.g., directly to bus 212.

Other components (not illustrated) may be connected in a similar manner (e.g., document scanners, digital cameras, printers, etc.). Conversely, all of the components illustrated in FIG. 2 need not be present. The components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded into system memory 217 from a remote location (i.e., a remotely located computer system 210), for example via the network interface 248 or modem 247. In FIG. 2, the redundancy reducing management system 101 is illustrated as residing in system memory 217. The workings of the redundancy reducing management system 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 and or modem 247 can be directly or indirectly communicatively coupled to a network 107 such as the Internet. Such coupling can be wired or wireless.

Figure 3:
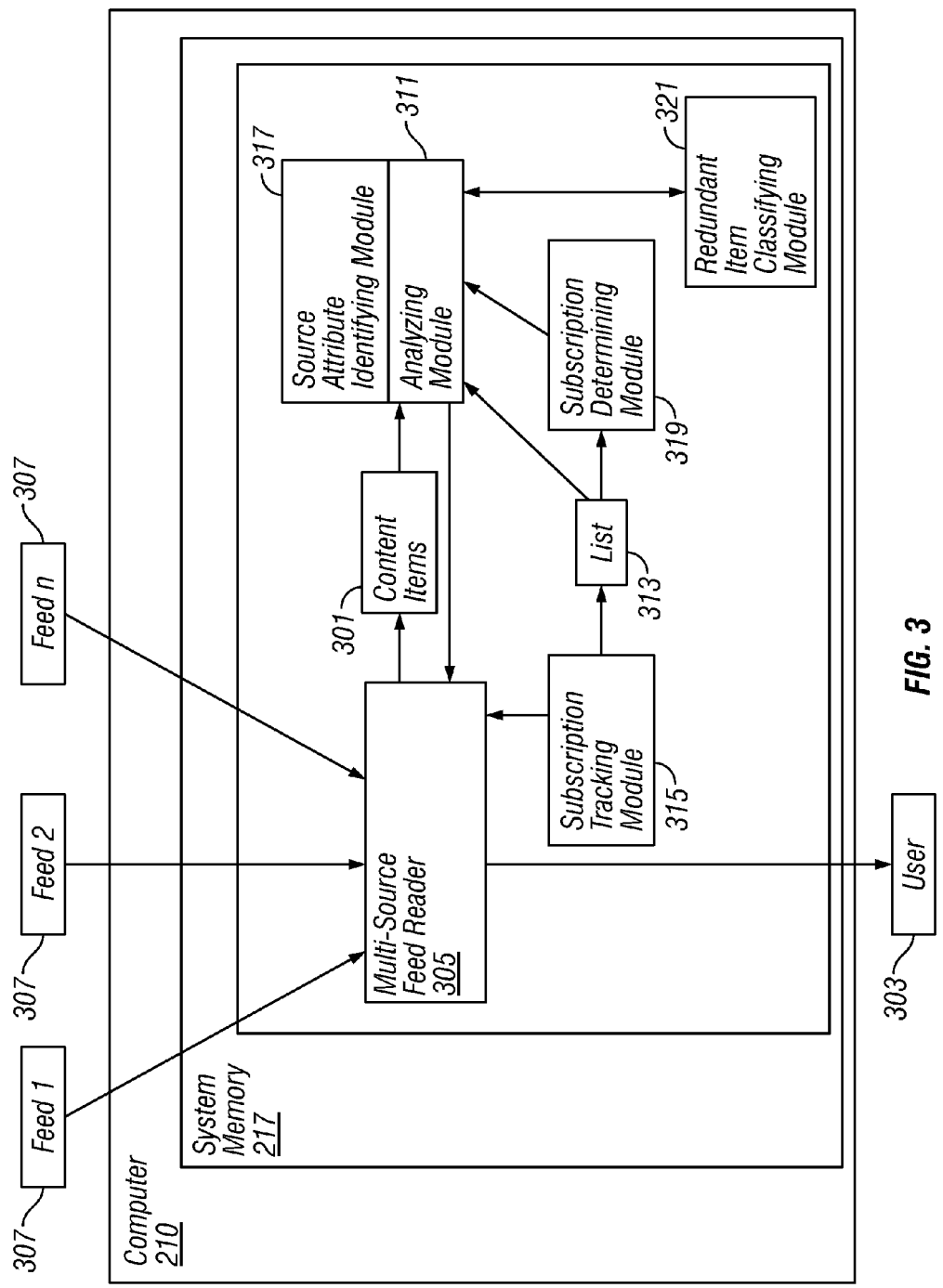
FIG. 3 is a block diagram of the operation of a redundancy reducing management system, according to some embodiments.

FIG. 3 illustrates the operation of a redundancy reducing management system 101 residing in the system memory 217 of a computer 210, according to some embodiments. As described above, the functionalities of the redundancy reducing management system 101 can reside on a server 105, a client 103, or be distributed between multiple computer systems 210, including within a cloud-based computing environment in which the functionality of the redundancy reducing management system 101 is provided as a service over a network 107. It is to be understood that although the redundancy reducing management system 101 is illustrated in FIG. 3 as a single entity, the illustrated redundancy reducing management system 101 represents a collection of functionalities, which can be instantiated as a single or multiple modules as desired (an instantiation of specific, multiple modules of the redundancy reducing management system 101 is illustrated in FIG. 3). It is to be understood that the modules of the redundancy reducing management system 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the redundancy reducing management system 101 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

As illustrated in FIG. 3, a redundancy reducing management system 101 reduces the total number of content items 301 provided to a user 303 by a multi-source feed reader 305, by identifying and eliminating redundant content items 301 from multiple feeds to which the user 303 subscribes. It is to be understood that as used herein, a content item 301 is a specific unit of electronic digital content provided by a feed 307. For example, a content item can comprise a blog entry, an online news story, an online article, a social networking post, a Twitter tweet, etc. As used herein, a feed 307 is a specific source to which a user 303 can subscribe and unsubscribe to automatically receive new content items 301 as they become available. For example, a feed 307 can comprise a blog, an online news source, a web site, a Twitter user, etc.

As illustrated, a multi-source feed reader 305 runs on the computer 210. The multi-source feed reader 305 can be in the form of a hosted application like Google Reader, NetVibes or BlogLines, or in the form of a client based application like Microsoft Outlook. The multi-source feed reader 305 uses conventional functionality to allow the user 303 to subscribe and unsubscribe to multiple feeds 307. The multi-source feed reader 305 also uses conventional functionality to obtain and enable the user 303 to access content items 301 from feeds 307 to which s/he subscribes. In additional to conventional multi-source feed reader 305 functionality, the multi-source feed reader 305 makes the user's current feed subscription status available to a subscription tracking module 315 of the redundancy reducing management system 101, and provides feed originated content items 301 to an item analyzing module 311 of the redundancy reducing management system 101 prior to making them available to the user 303.

The subscription tracking module 315 maintains a list 313 of all the feeds 307 to which the user 303 currently subscribes. The item analyzing module 311 receives content items 301 as input. The item analyzing module 311 also has access to the feed subscription list 313 maintained by the subscription tracking module 315. The item analyzing module 311 analyzes each received content item 301, to determine whether it is based on similar content from another feed 307 to which the user 303 subscribes.

More specifically, a source attribute identifying module 317 of the redundancy reducing management system 101 identifies attributes in the content item 301 which indicate a source on which the content item 301 is based. Where such an attribute is found, it is determined whether the source on which the content item 301 is based is a feed 307 other than the feed 307 from which the content item 301 originates. As explained above, many content items 301 are based on information gleaned from other sources, and are thus redundant to the original underlying source item, as well as to any other content items 301 based either directly or indirectly on the underlying source. Attributes identifying a source on which a content item 301 being analyzed is based can be in the form of text such as "Via SOURCENAME", "Source SOURCENAME", "Credit SOURCENAME" or similar, where SOURCENAME is the name of another feed 307 that posted source information (e.g., the name of a specific blog or online news provider) or the name of the original, underlying source (online content or otherwise). In other embodiments, source attributes can be in different formats as desired.

When a source attribute is found in a specific content item 301 being analyzed, a subscription determining module 319 of the redundancy reducing management system 101 determines whether the identified source is on the list 313 of feeds 307 to which the user 303 currently subscribes. If the user 303 subscribes to the feed 307 that provided the information on which the current content item 301 is based, then providing the current content item 301 to the user would be redundant. This is so because it can be assumed that the user 303 has already received (or will receive) the underlying content item 301 from the source feed 307. Thus, the redundant content item is not presented to the user 303 (e.g., it is removed from the feed 307 prior to being displayed to the user 303). On the other hand, if no source attributes are found in a content item 301 being analyzed, or if only source attributes identifying sources to which the user 303 does not subscribe are found, then the content item 301 is not considered to be redundant, and is made available to the user 303 through the multi-source feed reader 305.

In one embodiment, when the above described analysis discovers that the feeds 307 subscribed to by the user 303 provide redundant content items 301, a redundant item classifying module 321 of the redundancy reducing management system 101 classifies the multiple redundant content items 301 into a hierarchy. An optional "show redundant items" feature could then display this hierarchy of redundant content items 301 to the user 303. For example, suppose the analysis discovers that the user 303 subscribes to a first feed 307 (feed A) which provides an article (content item A). The user subscribes to two additional feeds (feeds $B_1$ and $B_2$) each of which provides a separate article (content items $B_1$ and $B_2$) based on content item A. Finally, the user subscribes to yet another feed C, which provides content item C, which is based on content item $B_1$. Under this scenario, absent the use of the "show redundant items" feature, the redundancy reducing management system 101 would only display content item A to the user 303. However, if the user 303 elects to show the redundant items (e.g., by operating a corresponding user interface component (not illustrated)), a graphic depiction of the hierarchy of redundant items A, $B_1$, $B_2$ and C would be displayed, prompting the user to select and view any of these redundant content items 301 if desired. By electing to not show redundant items, the hierarchy would not be displayed, and of the group of items only item A would be presented to the user 303.

It is to be understood that the above-described functionality of the redundancy reducing management system 101 enables the multi-source feed reader 305 to avoid displaying redundant content items 301 to the user even where the redundant content items 301 are not identical duplicates, but are in the form of multiple content items 301 based directly and/or indirectly on a common source, such that the redundant content items 301 contain differently worded and/or formatted versions of the same and/or overlapping content.

Figure 4:
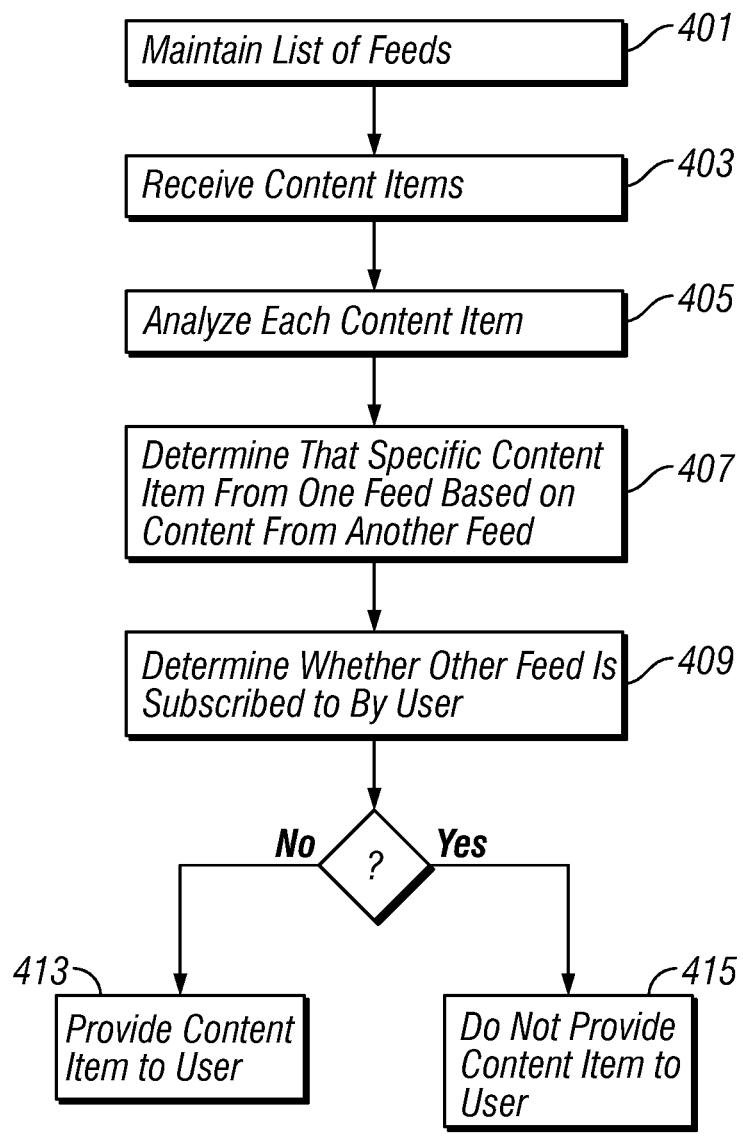
FIG. 4 is a flowchart of the operation of a redundancy reducing management system, according to some embodiments.

FIG. 4 illustrates steps of the operation of the redundancy reducing management system 101 (FIG. 1), according to some embodiments. The subscription tracking module 315 (FIG. 3) maintains 401 a list 313 (FIG. 3) of all the feeds 307 (FIG. 3) to which the user 303 (FIG. 3) currently subscribes. The analyzing module 311 (FIG. 3) receives 403 content items 301 (FIG. 3) coming from feeds 307 (FIG. 3) prior to the content items 301 (FIG. 3) being made available to the user 303 (FIG. 3). The analyzing module 311 (FIG. 3) analyzes 405 each received content item 301 (FIG. 3), to determine whether it is based on source content from a different feed 307 (FIG. 3). The analyzing module 311 (FIG. 3) determines 407 that a specific received content item 301 (FIG. 3) from a first feed 307 (FIG. 3) is based on content from a second feed 307 (FIG. 3). In response, the subscription determining module 319 (FIG. 3) determines 409 whether the user 303 (FIG. 3) subscribes to the second feed 307 (FIG. 3) which the source content is from. If the user does subscribe to the second feed 307 (FIG. 3), the specific received content item 301 (FIG. 3) is not provided 411 to the user 303 (FIG. 3). If not, the specific received content item 301 (FIG. 3) is provided 413 to the user 303 (FIG. 3).

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for automatically reducing redundant content items provided to a user by a multi-source feed reader, the method comprising the steps of:
   maintaining, by at least one computer, a list of a plurality of feeds to which the user subscribes through the multi-source feed reader;
   receiving, by the at least one computer, each content item obtained by the multi-source feed reader from each feed of the plurality, prior to the content items being made available to the user;
   analyzing, by the at least one computer, each received content item, to determine whether the content item being analyzed is based on source content from a different feed, on a per-item basis;
   determining, by the at least one computer, that a specific received content item from a first feed is based on source content from a second feed;
   identifying the second feed from which the source content of the content item originated;
   determining, by the at least one computer, whether the user subscribes to the second feed which the source content is from; and
   responsive to determining that the specific received content item is based on source content from the second feed and responsive to determining that the user subscribes to the second feed, not providing, by the at least one computer, the specific received content item, on a per-item basis, from the first feed to the user, while continuing to provide remaining content from both the first and second feed.

2. The method of claim 1 wherein determining, by the at least one computer, that a specific received content item from a first feed is based on source content from a second feed further comprises:
   identifying at least one attribute in the specific received content item indicating a source on which the specific received content item is based; and
   determining that the source on which the specific received content item is based comprises a feed other than the feed from which the specific received content item originates.

3. The method of claim 1 further comprising:
   determining, by the at least one computer, that a specific, additional received content item is not based on source content from a feed to which the user subscribes; and
   providing, by the at least one computer, the specific additional received content item to the user, responsive to determining that the specific additional received content item is not based on source content from a feed to which the user subscribes.

4. The method of claim 3 wherein determining, by the at least one computer, that a specific, additional received content item is not based on source content from a feed to which the user subscribes further comprises:
   searching for but not identifying any attributes in the specific, additional received content item indicating a source on which the specific, additional received content item is based.

5. The method of claim 3 wherein determining, by the at least one computer, that a specific, additional received content item is not based on source content from a feed to which the user subscribes further comprises:
   identifying at least one attribute in the specific, additional received content item indicating a source on which the specific, additional received content item is based; and
   determining that the source on which the specific, additional received content item is based does not comprise an additional feed to which the user subscribes.

6. The method of claim 1 further comprising:
   identifying, by the at least one computer, a plurality of redundant content items;
   receiving, by the at least one computer, an indication from the user to provide redundant content items; and
   responsive to receiving the indication, outputting the plurality of redundant content items to the user.

7. The method of claim 6 further comprising:
   classifying, by the at least one computer, the redundant content items of the plurality into a hierarchy;
   responsive to receiving the indication from the user to provide redundant content items, displaying a graphic depiction of the hierarchy of redundant content items to the user; and
   prompting the user to select and view redundant content items of the hierarchy.

8. The method of claim 1 wherein at least one content item is a type from a group of types consisting of:
   a blog entry; an online news story; an online article; a social networking post; and a Twitter tweet.

9. The method of claim 1 wherein at least one feed is a type from a group of types consisting of:
   a blog; an online news source; a web site; and a Twitter user.

10. At least one non-transitory computer readable storage medium storing a computer program product for automatically reducing redundant content items provided to a user by a multi-source feed reader, the computer program product comprising:
    program code for maintaining a list of a plurality of feeds to which the user subscribes through the multi-source feed reader;
    program code for receiving each content item obtained by the multi-source feed reader from each feed of the plurality, prior to the content items being made available to the user;
    program code for analyzing each received content item, to determine whether the content item being analyzed is based on source content from a different feed, on a per-item basis;
    program code for determining that a specific received content item from a first feed is based on source content from a second feed;
    program code for identifying the second feed from which the source content of the content item originated;
    program code for determining whether the user subscribes to the second feed which the source content is from; and
    program code for responsive to determining that the specific received content item is based on source content from the second feed and responsive to determining that the user subscribes to the second feed, not providing, by the at least one computer, the specific received content item, on a per-item basis, from the first feed to the user, while continuing to provide remaining content from both the first and second feed.

11. The computer program product of claim 10 wherein the program code for determining that a specific received content item from a first feed is based on source content from a second feed further comprises:

program code for identifying at least one attribute in the specific received content item indicating a source on which the specific received content item is based; and program code for determining that the source on which the specific received content item is based comprises a feed other than the feed from which the specific received content item originates.

12. The computer program product of claim 10 further comprising:

program code for determining that a specific, additional received content item is not based on source content from a feed to which the user subscribes; and program code for providing the specific additional received content item to the user, responsive to determining that the specific additional received content item is not based on source content from a feed to which the user subscribes.

13. The computer program product of claim 12 wherein the program code for determining that a specific, additional received content item is not based on source content from a feed to which the user subscribes further comprises:

program code for searching for but not identifying any attributes in the specific, additional received content item indicating a source on which the specific, additional received content item is based.

14. The computer program product of claim 12 wherein the program code for determining that a specific, additional received content item is not based on source content from a feed to which the user subscribes further comprises:

program code for identifying at least one attribute in the specific, additional received content item indicating a source on which the specific, additional received content item is based; and program code for determining that the source on which the specific, additional received content item is based does not comprise an additional feed to which the user subscribes.

15. The computer program product of claim 10 further comprising:

program code for identifying a plurality of redundant content items;

program code for receiving an indication from the user to provide redundant content items; and program code for, responsive to receiving the indication, outputting the plurality of redundant content items to the user.

16. The computer program product of claim 15 further comprising:

program code for classifying the redundant content items of the plurality into a hierarchy;

program code for, responsive to receiving the indication from the user to provide redundant content items, displaying a graphic depiction of the hierarchy of redundant content items to the user; and program code for prompting the user to select and view redundant content items of the hierarchy.

17. The computer program product of claim 10 wherein at least one content item is a type from a group of types consisting of:

a blog entry; an online news story; an online article; a social networking post; and a Twitter tweet.

18. The computer program product of claim 10 wherein at least one feed is a type from a group of types consisting of:

a blog; an online news source; a web site; and a Twitter user.

* * * * *